United States Patent
Fan et al.

(10) Patent No.: US 10,404,380 B2
(45) Date of Patent: Sep. 3, 2019

(54) COMPENSATION APPARATUS FOR OFFSET DRIFT, RECEIVED SIGNAL RECOVERY APPARATUS AND RECEIVER

(71) Applicant: Fujitsu Limited, Kawasaki-shi, Kanagawa (JP)

(72) Inventors: Yangyang Fan, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 18 days.

(21) Appl. No.: 15/720,576

(22) Filed: Sep. 29, 2017

(65) Prior Publication Data

US 2018/0131446 A1 May 10, 2018

(30) Foreign Application Priority Data

Nov. 10, 2016 (CN) ............. 2016 1 0990780

(51) Int. Cl.
*H04B 10/516* (2013.01)
*H04B 10/61* (2013.01)
(Continued)

(52) U.S. Cl.
CPC ....... *H04B 10/6164* (2013.01); *H04B 10/516* (2013.01); *H04B 10/6165* (2013.01);
(Continued)

(58) Field of Classification Search
CPC ............... H04B 10/6164; H04B 10/516; H04B 10/6165; H04B 10/6166; H04B 10/2513; H04B 10/60; H04B 10/61; H04J 14/06
(Continued)

(56) References Cited

U.S. PATENT DOCUMENTS 7,627,055 B2 * 12/2009 Coersmeier ....... H04L 25/03019
375/296
7,747,177 B2 * 6/2010 Chen ............... H04B 10/6165
398/204
(Continued)

FOREIGN PATENT DOCUMENTS

CN  103581078 A  2/2014
CN  105791182 A  7/2016
EP  2 846 505 A2  3/2015

OTHER PUBLICATIONS

Chen Xinghai et al."Joint estimation of and compensation for IQ imbalance in 60 GHz communication systems", China Academic Journal Electronic Publishing House, 1994-216, 6 pages.

*Primary Examiner* — Abbas H Alagheband
(74) *Attorney, Agent, or Firm* — Staas & Halsey LLP

(57) ABSTRACT

Embodiments of this disclosure provide a compensation apparatus for an offset drift, a received signal recovery apparatus and a receiver, in which estimation and compensation of an offset drift are directly performed at a receiver end, with no need of extra provision of an offset control circuit at a transmitter end, so that the system is simple in structure, applicable to various modulation formats, wide in applicability, and is able to meet demands for high-order modulation formats. And furthermore, by equalizing a received signal and performing phase recovery on a frequency difference and phase noises, information on offset points of a modulator of the transmitter end may be accurately separated, thereby accurately compensating for the offset drift of the modulator of the transmitter end.

7 Claims, 7 Drawing Sheets

(51) Int. Cl.
*H04J 14/06* (2006.01)
*H04B 10/69* (2013.01)
*H04B 10/2575* (2013.01)

(52) U.S. Cl.
CPC .......... *H04B 10/6166* (2013.01); *H04J 14/06* (2013.01); *H04B 10/2575* (2013.01); *H04B 10/614* (2013.01); *H04B 10/6161* (2013.01); *H04B 10/6971* (2013.01)

(58) Field of Classification Search
USPC ....... 398/192, 115, 149, 159, 202, 204, 205, 398/208, 209, 213, 65
See application file for complete search history.

(56) References Cited

U.S. PATENT DOCUMENTS

| | | | | |
|---|---|---|---|---|
| 8,526,831 B2* | 9/2013 | Winzer | ................... | H04J 14/06 398/209 |
| 8,571,423 B2* | 10/2013 | Winzer | ................... | H04J 14/06 398/208 |
| 8,638,893 B2* | 1/2014 | Dark | ................... | H04B 1/0028 375/296 |
| 8,767,575 B2* | 7/2014 | Zhang | ................... | H04B 10/611 370/252 |
| 8,913,901 B2* | 12/2014 | Zhang | ................... | H04B 10/613 375/232 |
| 9,077,455 B2* | 7/2015 | Randel | ................ | H04B 10/616 |
| 9,191,120 B2* | 11/2015 | Zhou | ................... | H04B 10/516 |
| 9,876,569 B2* | 1/2018 | Zhou | ................... | H04B 10/516 |
| 2012/0155890 A1* | 6/2012 | Zhou | ................... | H04B 10/6165 398/208 |
| 2012/0230676 A1* | 9/2012 | Mo | ...................... | H04B 10/614 398/25 |
| 2012/0300818 A1* | 11/2012 | Metreaud | ................. | H04B 1/30 375/219 |
| 2013/0070786 A1* | 3/2013 | Liu | .......................... | C02F 1/78 370/464 |
| 2013/0251369 A1* | 9/2013 | Ogasahara | ........... | H04B 10/614 398/65 |
| 2015/0200731 A1 | 7/2015 | Bisplinghoff et al. | | |
| 2016/0112143 A1* | 4/2016 | Yu | ..................... | H04B 10/6164 398/65 |
| 2017/0353246 A1* | 12/2017 | Frankel | ................. | H04B 10/40 |
| 2018/0159652 A1* | 6/2018 | Calabro | ............ | H04B 10/6161 |

* cited by examiner

US 10,404,380 B2

COMPENSATION APPARATUS FOR OFFSET DRIFT, RECEIVED SIGNAL RECOVERY APPARATUS AND RECEIVER

CROSS-REFERENCE TO RELATED APPLICATIONS

This application claims the benefit of Chinese Application No. 201610990780.8, filed Nov. 10, 2016, in the Chinese Intellectual Property Office, the disclosure of which is incorporated herein by reference.

TECHNICAL FIELD

This disclosure relates to the field of communications technologies, and in particular to a compensation apparatus for an offset drift, a received signal recovery apparatus and a receiver.

BACKGROUND

In a high-speed optical communications system, a modulator is generally needed to be provided at a transmitter end to modulate transmitted signals; for example, vector modulators are widely used. A vector modulator may move a spectrum in an electrical domain to near an optical frequency in a near lossless manner, so as to achieve a spectral utilization in conjunction with a coherent monitoring technique of a receiver end. In recent years, digital signal processing (DSP) algorithms directed to link damages and receiver imbalance characteristics have been proposed in succession, and based upon which, transmission capacities and modulation formats of optical communications systems may be increased and extended continuously.

For a large-capacity optical communications system, high-order modulation is more sensitive to a loss in the system, and the loss of the system includes a nonideal characteristic of a transmitter. In practical use, in order that a modulator operates normally, it is needed to accurately set an offset voltage of the modulator. However, due to such factors as an ambient temperature, and a drift of a central wave length of a laser, etc., normal offset points of the modulator cannot be accurately ensured. Hence, an offset drift occurs, which may result in that in-phase and quadrature (IQ) imbalance is generated in a transmitted signal.

For a special modulation signal, such as quadrature phase shift keying (QPSK), or quadrature amplitude modulation (QAM), an offset control circuit may be provided at the transmitter end to compensate for the offset drift. And another method for compensating for an offset drift of a modulator is to perform correction and compensation by using the DSP algorithm at a receiver end.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

When offset points of a modulator are controlled by using the above existing method in which an offset control circuit is provided, as an extra offset control circuit needs to be provided at the transmitter end, it will result in that a structure of the system will be complex. And for other modulation formats, such as frequency division multiplexing (FDM), or orthogonal frequency division multiplexing (OFDM), an effect of the offset control circuit is not very well. Furthermore, a precision of controlling the offset point by the offset control circuit is unable to satisfy a demand of a high-order modulation format.

When an existing method is used to perform correction and compensation at a receiver end by using a DSP algorithm, as a received signal contains a phase noise and damages in a transmission link, information characterizing offset points of a modulator of a transmitter end is hard to be accurately separated, hence, it is hard to accurately compensate for an offset drift of the modulator of the transmitter end.

Embodiments of this disclosure provide a compensation apparatus for an offset drift, a received signal recovery apparatus and a receiver, in which estimation and compensation of an offset drift are directly performed at a receiver end, with no need of extra provision of an offset control circuit at a transmitter end, so that the system is simple in structure, applicable to various modulation formats, wide in applicability, and is able to meet demands for high-order modulation formats. And furthermore, by equalizing a received signal and performing phase recovery on a frequency difference and phase noises, information on offset points of a modulator of the transmitter end may be accurately separated, thereby accurately compensating for the offset drift of the modulator of the transmitter end.

According to a first aspect of the embodiments of this disclosure, there is provided a compensation apparatus for an offset drift of a modulator of a transmitter end, including: a first compensating unit configured to compensate for IQ imbalance generated at a receiver end by a received signal of the receiver end; a first equalizing unit configured to perform equalization on the compensated received signal; a first estimating unit configured to estimate a frequency difference between a transmitter end laser and a receiver end laser and phase noises of the transmitter end laser and the receiver end laser according to the equalized received signal; a recovering unit configured to perform phase recovery on the compensated received signal according to the estimated frequency difference and phase noises; and a second compensating unit configured to, for the phase recovered received signal, compensate for IQ imbalance generated by the offset drift of the modulator of the transmitter end.

According to a second aspect of the embodiments of this disclosure, there is provided a received signal recovery apparatus, including: the compensation apparatus for an offset drift of a modulator of a transmitter end as described in the first aspect of the embodiments of this disclosure; a second equalizing unit configured to perform equalization on the received signal with IQ imbalance generated by the offset drift of a modulator of a transmitter end being compensated; a third compensating unit configured to perform residual phase compensation on the equalized received signal; and an outputting unit configured to judge the residual phase compensated received signal and output the received signal.

According to a third aspect of the embodiments of this disclosure, there is provided a receiver, including the compensation apparatus for an offset drift of a modulator of a transmitter end as described in the first aspect of the embodiments of this disclosure or the received signal recovery apparatus as described in the second aspect of the embodiments of this disclosure.

Advantages of the embodiments of this disclosure exist in that estimation and compensation of an offset drift are directly performed at a receiver end, with no need of extra provision of an offset control circuit at a transmitter end, so that the system is simple in structure, applicable to various modulation formats, wide in applicability, and is able to meet demands for high-order modulation formats. And furthermore, by equalizing a received signal and performing phase recovery on a frequency difference and phase noises, information on offset points of a modulator of the transmitter end may be accurately separated, thereby accurately compensating for the offset drift of the modulator of the transmitter end.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present invention, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the terms of the appended claims.

Embodiment 1

Figure 1:
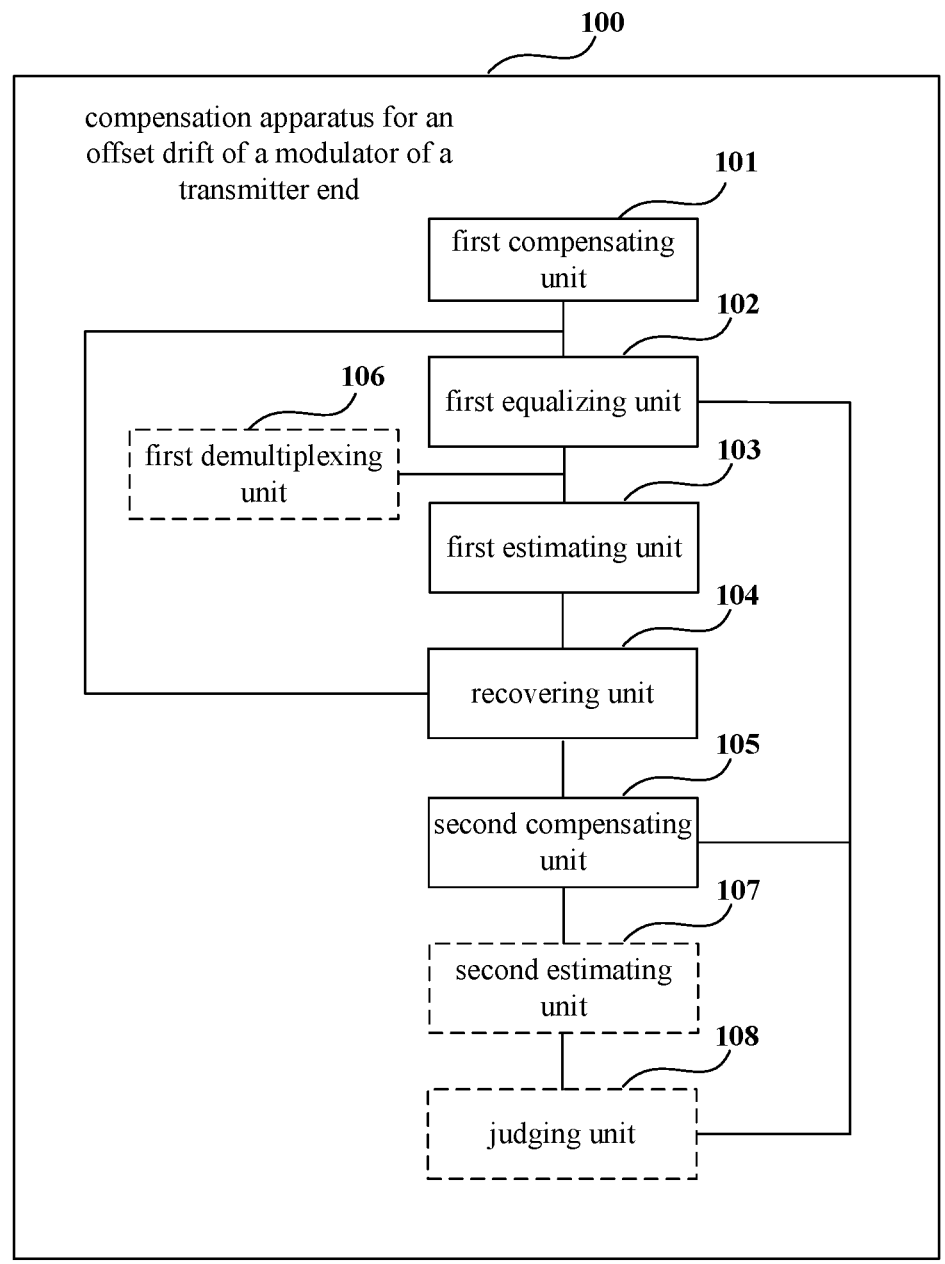
FIG. 1 is a schematic diagram of a compensation apparatus for an offset drift of a modulator of a transmitter end of Embodiment 1 of this disclosure.

FIG. 1 is a schematic diagram of the compensation apparatus for an offset drift of a modulator of a transmitter end of Embodiment 1 of this disclosure. As shown in FIG. 1, the apparatus 100 includes:

a first compensating unit 101 configured to compensate for IQ imbalance generated at a receiver end by a received signal of the receiver end;

a first equalizing unit 102 configured to perform equalization on the compensated received signal;

a first estimating unit 103 configured to estimate a frequency difference between a transmitter end laser and a receiver end laser and phase noises of the transmitter end laser and the receiver end laser according to the equalized received signal;

a recovering unit 104 configured to perform phase recovery on the compensated received signal according to the estimated frequency difference and phase noises; and a second compensating unit 105 configured to, for the phase recovered received signal, compensate for IQ imbalance generated by the offset drift of the modulator of the transmitter end.

It can be seen from the above embodiment that estimation and compensation of an offset drift are directly performed at a receiver end, with no need of extra provision of an offset control circuit at a transmitter end, so that the system is simple in structure, applicable to various modulation formats, wide in applicability, and is able to meet demands for high-order modulation formats. And furthermore, by equalizing a received signal and performing phase recovery on a frequency difference and phase noises, information on offset points of a modulator of the transmitter end may be accurately separated, thereby accurately compensating for the offset drift of the modulator of the transmitter end.

In this embodiment, the received signal refers to a signal in an optical communications system that is transmitted from the transmitter end and received at the receiver end after passing a transmission link.

In this embodiment, an optical communications system to which the compensation apparatus for an offset drift of a modulator of a transmitter end of this embodiment is applied shall be illustrated by taking that an IQ modulator is used at the transmitter end as an example.

Figure 2:
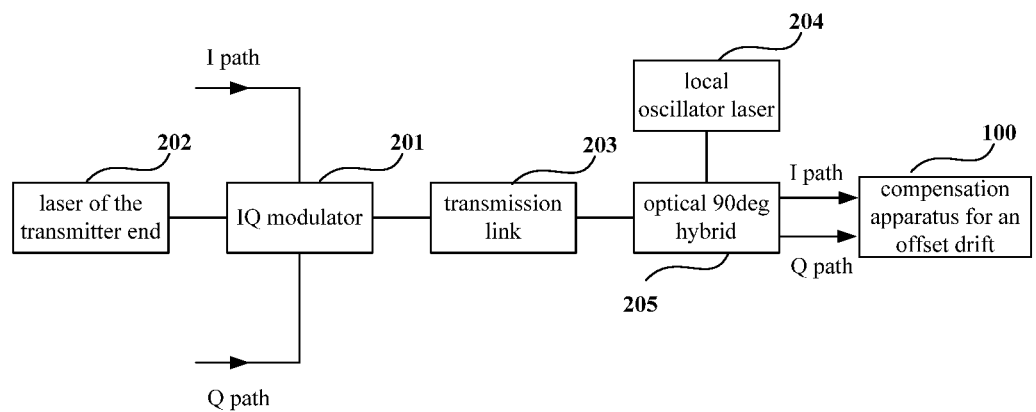
FIG. 2 is a schematic diagram of an optical communications system to which the compensation apparatus for an offset drift of a transmitter end is applied of Embodiment 1 of this disclosure.

FIG. 2 is a schematic diagram of the optical communications system to which the compensation apparatus for an offset drift of a modulator of a transmitter end is applied of Embodiment 1 of this disclosure. As shown in FIG. 2, at a transmitter end, I path data and Q path data are respectively inputted into an IQ modulator 201, thus, an I path offset point and a Q path offset point are formed in the IQ modulator 201. A laser emitted from a laser 202 of the transmitter end is inputted into the IQ modulator 201, and a transmitted signal reaches a receiver end after being modulated by the IQ modulator 201 and transmitted by a transmission link 203. At the receiver end, a local oscillator laser 204 is inputted into an optical 90 deg hybrid 205, and after a received signal passes the optical 90 deg hybrid 205, I path and Q path received signals at the receiver end are obtained, which are inputted into the compensation apparatus for an offset drift 100 shown in FIG. 1 for being processed.

In this embodiment, at the transmitter end and the receiver end shown in FIG. 2, some other components, such as a digital-to-analog converter (DAC), an photoelectric converter, and an analog-to-digital converter (ADC), etc., may further be included, structures and functions of which being similar to those in the related art, which shall not be described herein any further.

After the laser 202 of the transmitter end and the IQ modulator 201 operate for a period of time, as the ambient temperature changes and a central wavelength of the laser drifts, the I path offset point and the Q path offset point of the IQ modulator 201 also drift, resulting in generation of direct current signals in a real part and an imaginary part of the transmitted signal, imbalance between amplitudes of a real part signal and an imaginary part signal, and introduction of an extra phase difference between the real part signal and imaginary part signal. Herein, the imbalance between amplitudes of the real part signal and imaginary part signal and the extra phase difference are referred to as IQ imbalance induced by the offset drift of the modulator of the transmitter end.

For example, the transmitted signal modulated by the IQ modulator in which offset drift occurs may be expressed by formula (1) below:

$$A(t)=k_I I(t)+j*k_Q e^{j\theta}Q(t)+I_0+jQ_0 \qquad (1);$$

where A(t) denotes the transmitted signal, t denotes time, $k_I$ and $k_Q$, respectively denote an amplitude of the real part signal and an amplitude of the imaginary part signal, I(t) and Q(t) respectively denote the real part signal and the imaginary part signal $I_0$ and $Q_0$ respectively denote direct current signals generated in the real part signal and the imaginary part signal, and θ denotes a phase difference between the real part signal and the imaginary part signal.

In this embodiment, the offset drift of the modulator of the transmitter end may include the imbalance $k_I/k_Q$ between amplitudes of the real part signal and the imaginary part signal, the direct current signal $I_0$ generated in the real part signal, the direct current signal $Q_0$ generated in the imaginary part signal, and the phase difference θ between the real part signal and the imaginary part signal.

In this embodiment, the first compensating unit 101 compensates for the IQ imbalance generated at the receiver end by the received signal of the receiver end; the IQ imbalance generated by the received signal at the receiver end is, for example, imbalance of amplitude and phase induced by the optical 90 deg hybrid, and the IQ imbalance generated by the received signal at the receiver end may be compensated for by using an existing method.

For example, $k_I/k_Q$, $I_0$, $Q_0$ and θ may be calculated by using the following method: a) calculating mean values of the real part and the imaginary part of the received signal respectively, and taking them respectively as $I_0$ and $Q_0$; b) calculating a ratio of power of the real part and the imaginary part, and obtaining $k_I/k_Q$ after calculating a square root of the ratio; and c) calculating a mean value of multiplication of the real part by the imaginary part and a mean value of square of the imaginary part, and obtaining −tan(θ) after the former is divided by the latter, and hence obtaining θ. After calculating $k_I/k_Q$, $I_0$, $Q_0$ and θ, the received signal is compensated for according to the calculation results.

In this embodiment, the first equalizing unit 102 performs equalization on the compensated received signal; for example, an existing method may be used for the equalization, such as a blind equalization method, or a method based on a training sequence.

In this embodiment, the first estimating unit 103 estimates the frequency difference between the transmitter end laser and the receiver end laser and the phase noises of the transmitter end laser and the receiver end laser according to the equalized received signal. An existing method may be used for estimating the frequency difference and the phase noises, such as a phase estimation method based on the fourth power with decision or with no decision, or a method based on phase measurement.

In this embodiment, the recovering unit 104 performs phase recovery on the compensated received signal according to the estimated frequency difference and phase noises. For example, the estimated frequency difference and phase noises are removed from the received signal compensated by the first compensating unit 101, so as to obtain a phase recovered received signal.

In this embodiment, for example, as it is possibly needed to eliminate data at a starting part and an ending part of a whole section of data in performing equalization and estimation of the frequency difference and the phase noises, in performing phase recovery, time alignment may be performed first.

Figure 3:
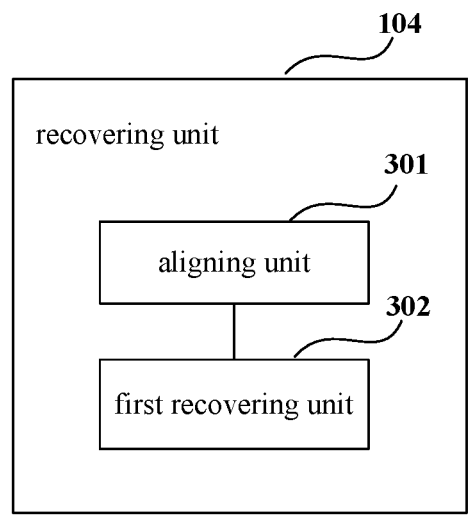
FIG. 3 is a schematic diagram of a recovering unit 104 of Embodiment 1 of this disclosure.

FIG. 3 is a schematic diagram of the recovering unit 104 of Embodiment 1 of this disclosure. As shown in FIG. 3, the recovering unit 104 includes:

an aligning unit 301 configured to temporally align the compensated received signal and the estimated phase noises; and a first recovering unit 302 configured to perform phase recovery on the temporally aligned received signal according to the estimated frequency difference and phase noises.

In this embodiment, the second compensating unit 105 configured to, for the phase recovered received signal, compensate for the IQ imbalance generated by the offset drift of the modulator of the transmitter end; as phase noises and other damages are removed from the phase recovered received signal here, information on the offset points of the modulator of the transmitter end may be accurately separated, hence, an existing method may be used to compensate for the IQ imbalance. For example, a compensation method identical to that used by the first compensating unit 101 may be used.

What described above is directed to a single-polarization optical communications system. And for a dual-polarization optical communications system, the apparatus 100 may further include:

a first demultiplexing unit 106 configured to demultiplex the equalized received signal to obtain received signals in two polarization states.

In this embodiment, the first demultiplexing unit 106 may use an existing method for demultiplexing the received signal. And furthermore, for the dual-polarization optical communications system, the first demultiplexing unit 106 and the first equalizing unit 102 may be achieved by the same functional module.

In this embodiment, the first demultiplexing unit 106 is optional, and is shown in a dotted line frame in FIG. 1.

Figure 4:
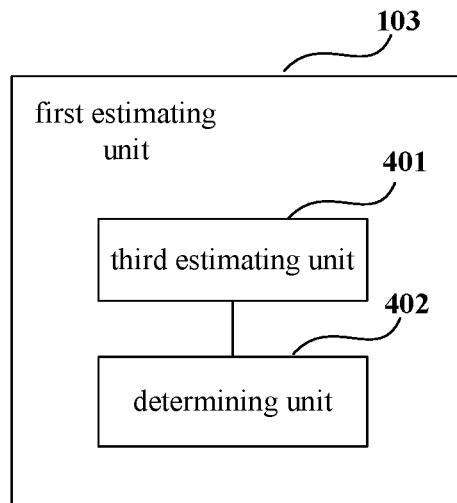
FIG. 4 is a schematic diagram of a first estimating unit 103 of Embodiment 1 of this disclosure.

In this embodiment, for the dual-polarization optical communications system, FIG. 4 is a schematic diagram of the first estimating unit 103 of Embodiment 1 of this disclosure. As shown in FIG. 4, the first estimating unit 103 includes:

a third estimating unit 401 configured to respectively estimate the frequency difference and the phase noises corresponding to the two polarization states according to the received signals in two polarization states; and a determining unit 402 configured to take mean values of the frequency difference and the phase noises in the two polarization states as the estimated frequency difference and phase noises.

In this embodiment, a method for estimating the frequency difference and the phase noises by the third estimating unit 401 is identical to that in the single-polarization optical communications system, and shall not be described herein any further.

In this embodiment, the apparatus 100 may further include:

a second estimating unit 107 configured to estimate a level of IQ imbalance in the received signal with the IQ imbalance generated by the offset drift of the modulator of the transmitter end being compensated; and a judging unit 108 configured to judge whether the estimated level of IQ imbalance satisfies a predetermined condition, when the estimated level of IQ imbalance satisfies the predetermined condition, output the received signal with the IQ imbalance generated by the offset drift of the modulator of the transmitter end being compensated and take it as an offset drift compensated output signal, and when the estimated level of IQ imbalance does not satisfy the predetermined condition, output the received signal with the IQ imbalance generated by the offset drift of the modulator of the transmitter end being compensated to the first equalizing unit 102, so that the first equalizing unit 102 re-performs the equalization on the received signal with the IQ imbalance generated by the offset drift of the modulator of the transmitter end being compensated, the first estimating unit 103 re-estimates the frequency difference and the phase noises, the recovering unit 104 re-performs the phase recovery and the second compensating unit 105 re-compensates for the IQ imbalance generated by the offset drift of the modulator of the transmitter end.

Hence, in performing estimation on the level of the IQ imbalance in the compensated received signal, when the predetermined condition is not satisfied, cyclic iteration is performed, until the level of the IQ imbalance in the compensated received signal satisfies the predetermined condition, thereby more accurately compensating for the offset drift of the modulator of the transmitter end.

In this embodiment, the second estimating unit 107 and the judging unit 108 are optional, and are shown in dotted line frames in FIG. 1.

In this embodiment, the level of the IQ imbalance in the received signal with the IQ imbalance induced by the offset drift of the modulator of the transmitter end being compensated may be estimated by using an existing method.

For example, variation between amplitude imbalance and phase imbalance that are currently estimated and amplitude imbalance and phase imbalance that are estimated last time is taken as the level of the IQ imbalance, and the judging unit 108 judges whether the variation is less than a predetermined threshold. When the variation is less than the predetermined threshold, it is deemed that the predetermined condition is satisfied; and when the variation is greater than or equal to the predetermined threshold, it is deemed that the predetermined condition is not satisfied.

For example, equalization (and for a dual-polarization optical communications system, demultiplexing is performed further) and phase recovery may be performed again on the compensated received signal, so as to perform residual phase compensation. An obtained constellation of the received signal is compared with a preobtained reference constellation to judge whether a difference between them is within a permitted range. When the difference is within the permitted range, it is deemed that the predetermined condition is satisfied; otherwise, it is deemed that the predetermined condition is not satisfied.

For example, the received signal that is equalized again (and for a dual-polarization optical communications system, demultiplexing is performed further) and phase recovered again may be judged. And when a bit error rate is less than a predetermined threshold, it is deemed that the predetermined condition is satisfied; otherwise, it is deemed that the predetermined condition is not satisfied.

It can be seen from the above embodiment that estimation and compensation of an offset drift are directly performed at a receiver end, with no need of extra provision of an offset control circuit at a transmitter end, so that the system is simple in structure, applicable to various modulation formats, wide in applicability, and is able to meet demands for high-order modulation formats. And furthermore, by equalizing a received signal and performing phase recovery on a frequency difference and phase noises, information on offset points of a modulator of the transmitter end may be accurately separated, thereby accurately compensating for the offset drift of the modulator of the transmitter end.

Embodiment 2

Figure 5:
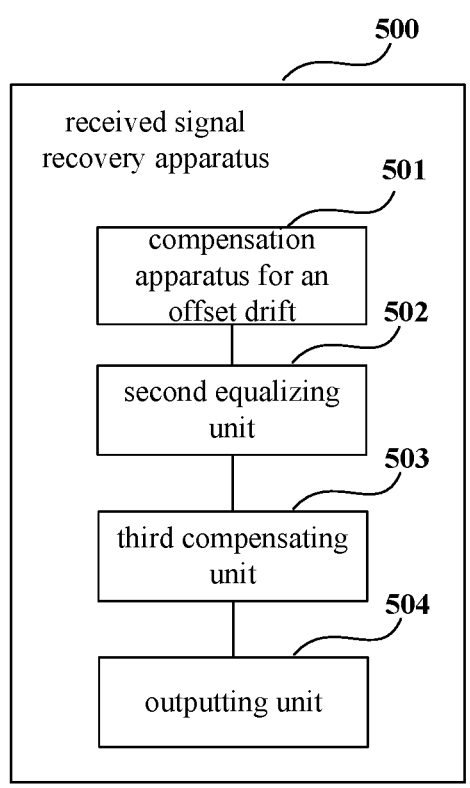
FIG. 5 is a schematic diagram of the received signal recovery apparatus of Embodiment 2 of this disclosure.

The embodiment of this disclosure further provides a received signal recovery apparatus, including the compensation apparatus for an offset drift of a modulator of a transmitter end as described in Embodiment 1. FIG. 5 is a schematic diagram of the received signal recovery apparatus of Embodiment 2 of this disclosure. As shown in FIG. 5, the apparatus 500 includes:

a compensation apparatus for an offset drift 501;

a second equalizing unit 502 configured to perform equalization on the received signal with IQ imbalance generated by the offset drift of a modulator of a transmitter end being compensated;

a third compensating unit 503 configured to perform residual phase compensation on the equalized received signal; and an outputting unit 504 configured to judge the residual phase compensated received signal and output the received signal.

In this embodiment, a structure and functions of the compensation apparatus for an offset drift 501 are identical to those of the compensation apparatus for an offset drift 100 in Embodiment 1, and shall not be described herein any further.

In this embodiment, the second equalizing unit 502 performs equalization on the received signal with IQ imbalance generated by the offset drift of the modulator of the transmitter end being compensated and obtained by the compensation apparatus for an offset drift 501. An existing method may be used for the equalization, such as a method identical to that used by the first equalizing unit 102.

In this embodiment, for a dual-polarization optical communications system, a demultiplexing unit may further be included, which demultiplexes the received signal equalized by the second equalizing unit 502.

In this embodiment, the third compensating unit 503 performs residual phase compensation on the equalized received signal. An existing method may be used for performing the residual phase compensation. For example, a method identical to that used by the first estimating unit 103 is used to estimate the frequency difference and the phase noises, and a method identical to that used by the recovering unit 104 is used to perform the phase recovery, so as to achieve residual phase compensation.

In this embodiment, the outputting unit 504 may use an existing method to judge the residual phase compensated received signal and output the received signal. Thus, a received signal accurately compensating for the offset drift of the modulator of the transmitter end may be outputted.

It can be seen from the above embodiment that estimation and compensation of an offset drift are directly performed at a receiver end, with no need of extra provision of an offset control circuit at a transmitter end, so that the system is simple in structure, applicable to various modulation formats, wide in applicability, and is able to meet demands for high-order modulation formats. And furthermore, by equalizing a received signal and performing phase recovery on a frequency difference and phase noises, information on offset points of a modulator of the transmitter end may be accurately separated, thereby accurately compensating for the offset drift of the modulator of the transmitter end.

Embodiment 3

Figure 6:
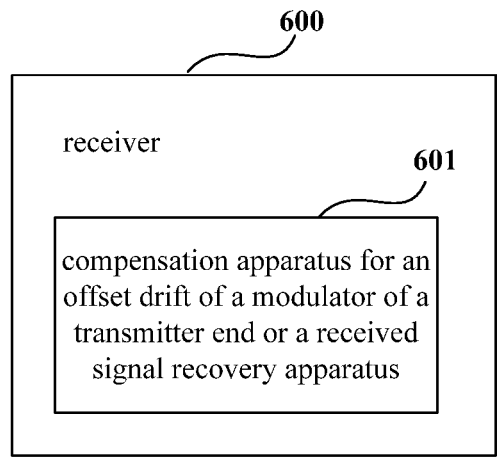
FIG. 6 is a schematic diagram of a structure of a receiver of Embodiment 3 of this disclosure.

The embodiment of this disclosure further provides a receiver. FIG. 6 is a schematic diagram of a structure of the receiver of Embodiment 3 of this disclosure. As shown in FIG. 6, the receiver 600 includes a compensation apparatus 601 for an offset drift of a modulator of a transmitter end or a received signal recovery apparatus 601, a structure and functions of which being identical to those contained in Embodiment 1 or 2, which shall not be described herein any further.

Figure 7:
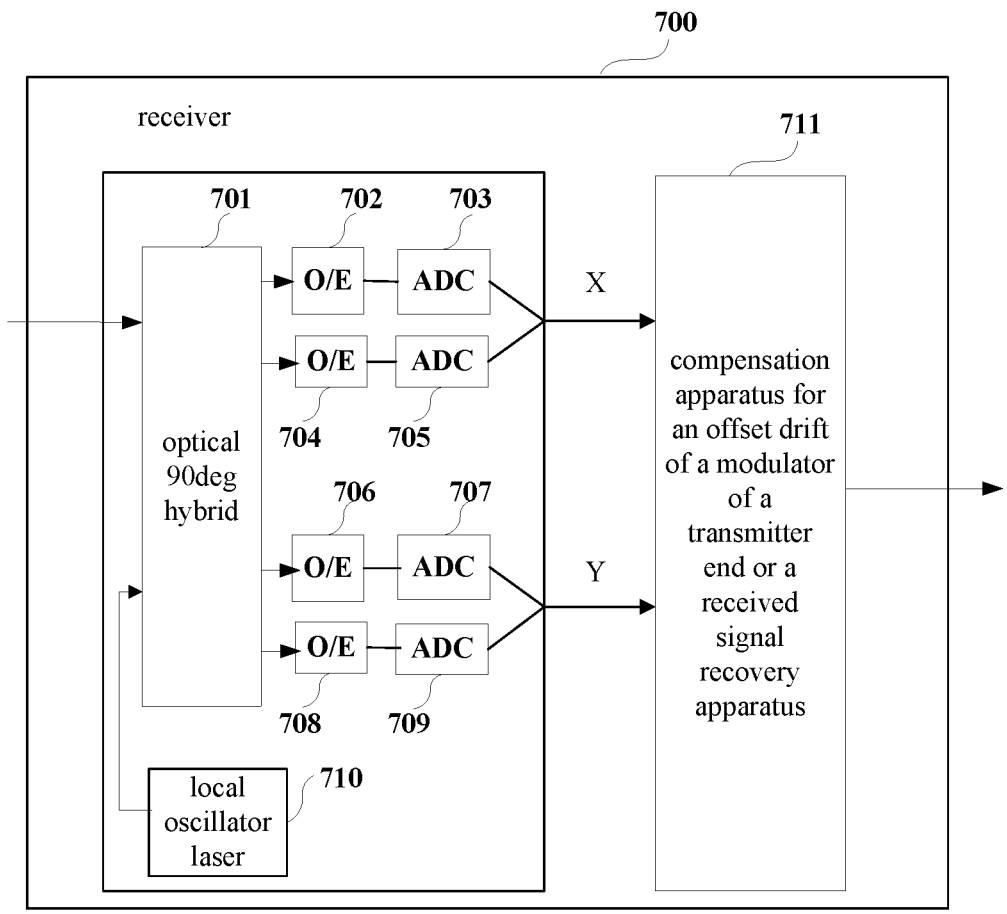
FIG. 7 is a block diagram of a systematic structure of the receiver of Embodiment 3 of this disclosure.

FIG. 7 is a block diagram of a systematic structure of the receiver of Embodiment 3 of this disclosure. As shown in FIG. 7, the receiver 700 includes:

a front end, which converts an inputted optical signal into baseband signals in two polarization states, in this embodiment, the two polarization states including an H polarization state and a V polarization state.

As shown in FIG. 7, the front end includes a local oscillator laser 710, an optical 90 deg hybrid 701, photoelectric (O/E) detectors 702, 704, 706 and 708, and analog-to-digital converters (ADCs) 703, 705, 707 and 709. In this embodiment, a structure and functions of a compensation apparatus 711 for an offset drift of a modulator of a transmitter end or a received signal recovery apparatus 711 are identical to those contained in Embodiment 1 or 2, which shall not be described herein any further. The local oscillator laser 710 is configured to provide a local light source; an optical signal is converted into a baseband signal in one polarization state after passing through the optical 90 deg hybrid 701, the photoelectric (O/E) detectors 702 and 704 and the analog-to-digital converters (ADCs) 703 and 705; and the optical signal is converted into a baseband signal in the other polarization state after passing through the optical 90 deg hybrid 701, the photoelectric (O/E) 706 and 708 and the analog-to-digital converters (ADCs) 707 and 709, with a detailed process being similar to that in the related art, and being not going to be described herein any further.

It can be seen from the above embodiment that estimation and compensation of an offset drift are directly performed at a receiver end, with no need of extra provision of an offset control circuit at a transmitter end, so that the system is simple in structure, applicable to various modulation formats, wide in applicability, and is able to meet demands for high-order modulation formats. And furthermore, by equalizing a received signal and performing phase recovery on a frequency difference and phase noises, information on offset points of a modulator of the transmitter end may be accurately separated, thereby accurately compensating for the offset drift of the modulator of the transmitter end.

Embodiment 4

Figure 8:
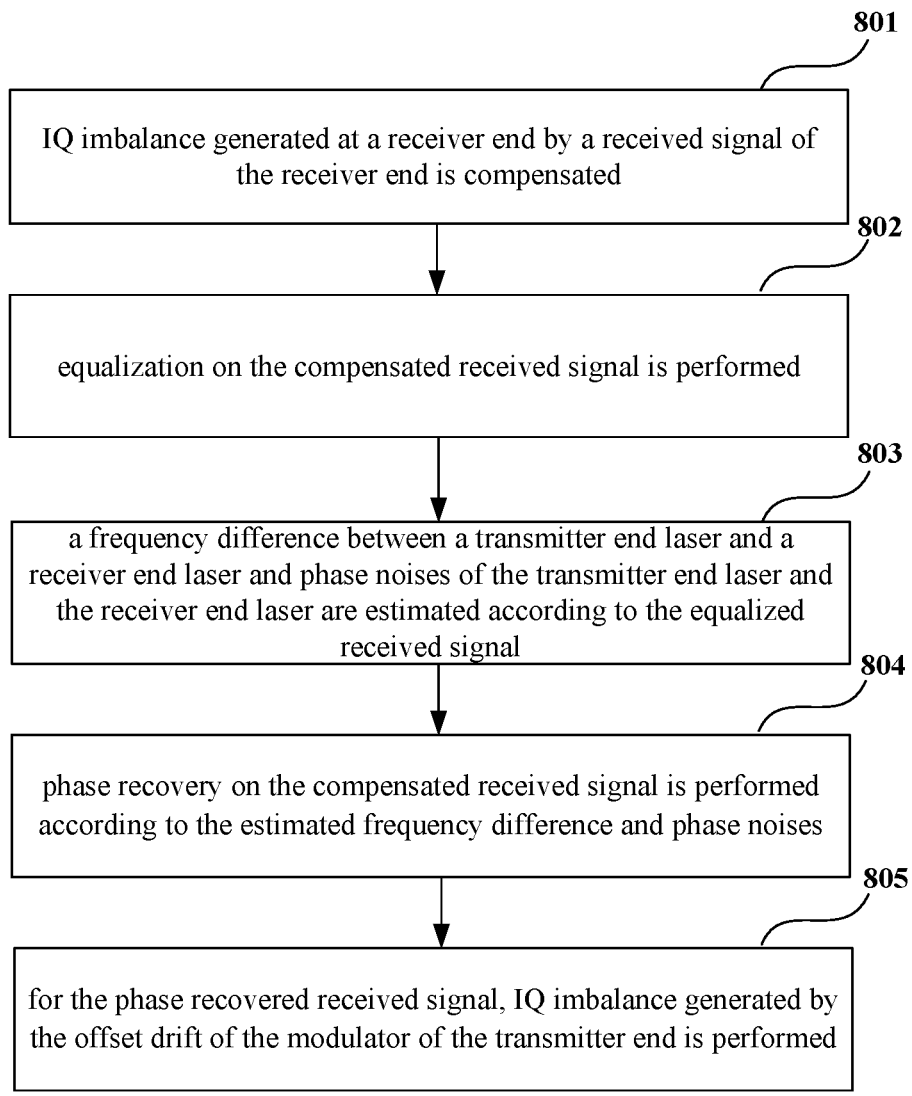
FIG. 8 is a flowchart of a compensation method for an offset drift of a modulator of a transmitter end of Embodiment 4 of this disclosure.

The embodiment of this disclosure further provides a compensation method for an offset drift of a modulator of a transmitter end, corresponding to the compensation apparatus for an offset drift of a modulator of a transmitter end described in Embodiment 1. FIG. 8 is a flowchart of the compensation method for an offset drift of a modulator of a transmitter end of Embodiment 4 of this disclosure. As shown in FIG. 8, the method includes:

Step 801: IQ imbalance generated at a receiver end by a received signal of the receiver end is compensated;

Step 802: equalization on the compensated received signal is performed;

Step 803: a frequency difference between a transmitter end laser and a receiver end laser and phase noises of the transmitter end laser and the receiver end laser are estimated according to the equalized received signal;

Step 804: phase recovery on the compensated received signal is performed according to the estimated frequency difference and phase noises; and Step 805: for the phase recovered received signal, IQ imbalance generated by the offset drift of the modulator of the transmitter end is performed.

Figure 9:
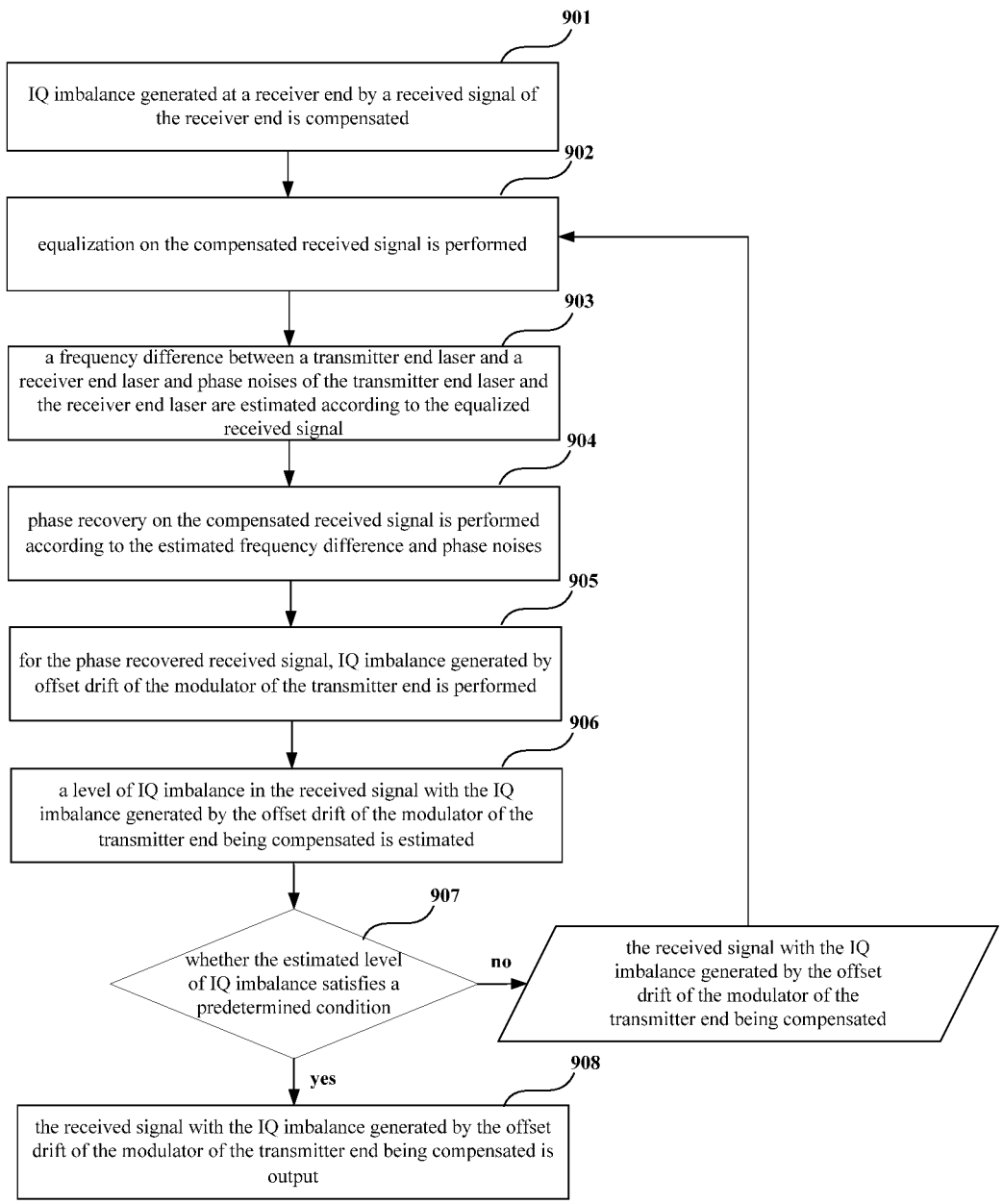
FIG. 9 is another flowchart of the compensation method for an offset drift of a modulator of a transmitter end of Embodiment 4 of this disclosure.

FIG. 9 is another flowchart of the compensation method for an offset drift of a modulator of a transmitter end of Embodiment 4 of this disclosure. As shown in FIG. 9, the method includes:

Step 901: IQ imbalance generated at a receiver end by a received signal of the receiver end is compensated;

Step 902: equalization on the compensated received signal is performed;

Step 903: a frequency difference between a transmitter end laser and a receiver end laser and phase noises of the transmitter end laser and the receiver end laser are estimated according to the equalized received signal;

Step 904: phase recovery on the compensated received signal is performed according to the estimated frequency difference and phase noises;

Step 905: for the phase recovered received signal, IQ imbalance generated by offset drift of the modulator of the transmitter end is performed;

Step 906: a level of IQ imbalance in the received signal with the IQ imbalance generated by the offset drift of the modulator of the transmitter end being compensated is estimated;

Step 907: it is judged whether the estimated level of IQ imbalance satisfies a predetermined condition, when a result of judgment is "no", entering into step 902, applying the received signal with the IQ imbalance generated by the offset drift of the modulator of the transmitter end being compensated obtained in step 905 to step 902, and equalizing the received signal with the IQ imbalance generated by the offset drift of the modulator of the transmitter end being compensated again, and when a result of judgment is "yes", entering into step 908; and Step 908: the received signal with the IQ imbalance generated by the offset drift of the modulator of the transmitter end being compensated is output.

In this embodiment, a method for compensating for the IQ imbalance generated at the receiver end, a method for equalizing the compensated received signal, a method for estimating the frequency difference and the phase noises, a method for performing phase recovery on the compensated received signal and a method for compensating for the IQ imbalance generated by the offset drift of the modulator of the transmitter end are identical to those contained in Embodiment 1, which shall not be described herein any further.

It can be seen from the above embodiment that estimation and compensation of an offset drift are directly performed at a receiver end, with no need of extra provision of an offset control circuit at a transmitter end, so that the system is simple in structure, applicable to various modulation formats, wide in applicability, and is able to meet demands for high-order modulation formats. And furthermore, by equalizing a received signal and performing phase recovery on a frequency difference and phase noises, information on offset points of a modulator of the transmitter end may be accurately separated, thereby accurately compensating for the offset drift of the modulator of the transmitter end.

Embodiment 5

Figure 10:
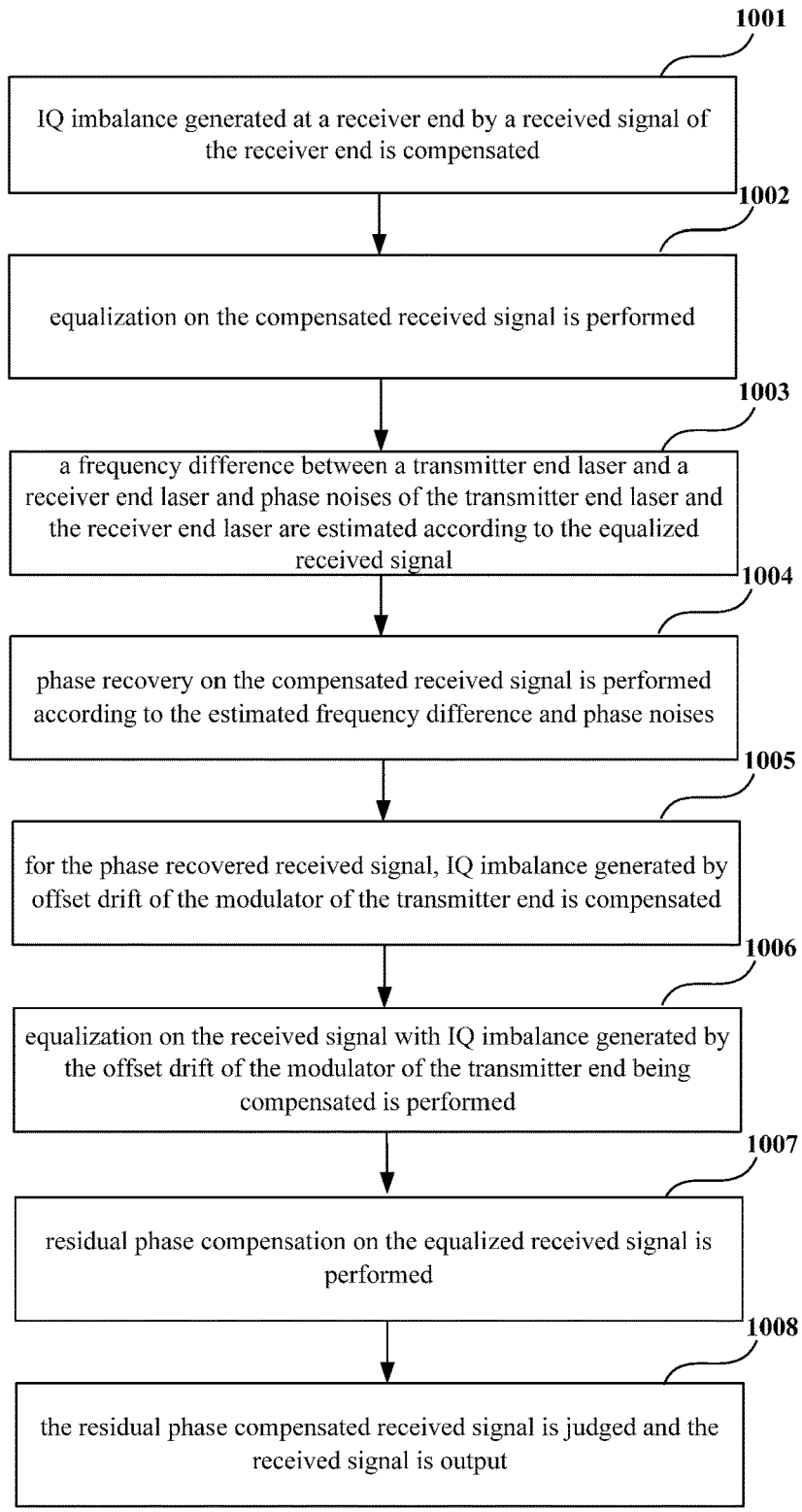
FIG. 10 is a flowchart of a received signal recovery method of Embodiment 5 of this disclosure.

The embodiment of this disclosure further provides a received signal recovery method, corresponding to the received signal recovery apparatus described in Embodiment 2. FIG. 10 is a flowchart of the received signal recovery method of Embodiment 5 of this disclosure. As shown in FIG. 10, the method includes:

Step 1001: IQ imbalance generated at a receiver end by a received signal of the receiver end is compensated;

Step 1002: equalization on the compensated received signal is performed;

Step 1003: a frequency difference between a transmitter end laser and a receiver end laser and phase noises of the transmitter end laser and the receiver end laser are estimated according to the equalized received signal;

Step 1004: phase recovery on the compensated received signal is performed according to the estimated frequency difference and phase noises;

Step 1005: for the phase recovered received signal, IQ imbalance generated by offset drift of the modulator of the transmitter end is compensated;

Step 1006: equalization on the received signal with IQ imbalance generated by the offset drift of the modulator of the transmitter end being compensated is performed;

Step 1007: residual phase compensation on the equalized received signal is performed; and Step 1008: the residual phase compensated received signal is judged and the received signal is output.

In this embodiment, steps 1001-1005 are identical to steps 801-805 in Embodiment 4, and a method for performing equalization, a method for performing residual phase compensation and a method for judging and outputting the received signal in steps 1006-1008 are identical to those contained in Embodiment 2, which shall not be described herein any further.

It can be seen from the above embodiment that estimation and compensation of an offset drift are directly performed at a receiver end, with no need of extra provision of an offset control circuit at a transmitter end, so that the system is simple in structure, applicable to various modulation formats, wide in applicability, and is able to meet demands for high-order modulation formats. And furthermore, by equalizing a received signal and performing phase recovery on a frequency difference and phase noises, information on offset points of a modulator of the transmitter end may be accurately separated, thereby accurately compensating for the offset drift of the modulator of the transmitter end.

An embodiment of the present disclosure provides a computer readable program code, which, when executed in a compensation apparatus for an offset drift of a modulator of a transmitter end, or a received signal recovery apparatus, or a receiver, will cause a computer to carry out the compensation method for an offset drift of a modulator of a transmitter end described in Embodiment 4 or the received signal recovery method described in Embodiment 5 in the compensation apparatus for an offset drift of a modulator of a transmitter end, or the received signal recovery apparatus, or the receiver.

An embodiment of the present disclosure provides a computer readable medium, including a computer readable program code, which will cause a computer to carry out the compensation method for an offset drift of a modulator of a transmitter end described in Embodiment 4 or the received signal recovery method described in Embodiment 5 in a compensation apparatus for an offset drift of a modulator of a transmitter end, or a received signal recovery apparatus, or a receiver.

The compensation method carried out in the compensation apparatus or the receiver described with reference to the embodiments of this disclosure may be directly embodied as hardware, software modules executed by a processor, or a combination thereof. For example, one or more functional block diagrams and/or one or more combinations of the functional block diagrams shown in FIG. 1 may either correspond to software modules of procedures of a computer program, or correspond to hardware modules. Such software modules may respectively correspond to the steps shown in FIG. 8. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in FIG. 1 may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams shown in FIG. 1 may also be realized as a combination of computing equipment, such as a combination of a DSP and a microprocessor, multiple processors, one or more microprocessors in communications combination with a DSP, or any other such configuration.

This disclosure is described above with reference to particular embodiments. However, it should be understood by those skilled in the art that such a description is illustrative only, and not intended to limit the protection scope of the present invention. Various variants and modifications may be made by those skilled in the art according to the principle of the present invention, and such variants and modifications fall within the scope of the present invention.

For implementations of the present invention containing the above embodiments, following supplements are further disclosed.

Supplement 1. A compensation apparatus for an offset drift of a modulator of a transmitter end, including:
 a first compensating unit configured to compensate for IQ imbalance generated at a receiver end by a received signal of the receiver end;
 a first equalizing unit configured to perform equalization on the compensated received signal;
 a first estimating unit configured to estimate a frequency difference between a transmitter end laser and a receiver end laser and phase noises of the transmitter end laser and the receiver end laser according to the equalized received signal;
 a recovering unit configured to perform phase recovery on the compensated received signal according to the estimated frequency difference and phase noises; and
 a second compensating unit configured to, for the phase recovered received signal, compensate for IQ imbalance generated by the offset drift of the modulator of the transmitter end.

Supplement 2. The apparatus according to supplement 1, wherein the apparatus further includes:
 a second estimating unit configured to estimate a level of IQ imbalance in the received signal with the IQ imbalance generated by the offset drift of the modulator of the transmitter end being compensated; and
 a judging unit configured to judge whether the estimated level of IQ imbalance satisfies a predetermined condition, when the estimated level of IQ imbalance satisfies the predetermined condition, output the received signal with the IQ imbalance generated by the offset drift of the modulator of the transmitter end being compensated and take it as an offset drift compensated output signal, and when the estimated level of IQ imbalance does not satisfy the predetermined condition, output the received signal with the IQ imbalance generated by the offset drift of the modulator of the transmitter end being compensated to the first equalizing unit, so that the first equalizing unit re-performs the equalization on the received signal with the IQ imbalance generated by the offset drift of the modulator of the transmitter end being compensated, the first estimating unit re-estimates the frequency difference and the phase noises, the recovering unit re-performs the phase recovery and the second compensating unit re-compensates for the IQ imbalance generated by the offset drift of the modulator of the transmitter end.

Supplement 3. The apparatus according to supplement 1, wherein the apparatus is used in a dual-polarization optical communications system and further includes:
 a first demultiplexing unit configured to demultiplex the equalized received signal to obtain received signals in two polarization states.

Supplement 4. The apparatus according to supplement 3, wherein the first estimating unit includes:
 a third estimating unit configured to respectively estimate the frequency difference and the phase noises corresponding to the two polarization states according to the received signals in two polarization states; and
 a determining unit configured to take mean values of the frequency difference and the phase noises in the two polarization states as the estimated frequency difference and phase noises.

Supplement 5. The apparatus according to supplement 1, wherein the recovering unit includes:
 an aligning unit configured to temporally align the compensated received signal and the estimated phase noises; and
 a first recovering unit configured to perform phase recovery on the temporally aligned received signal according to the estimated frequency difference and phase noises.

Supplement 6. A received signal recovery apparatus, including:
 the compensation apparatus for an offset drift of a modulator of a transmitter end as described in any one of supplements 1-5;
 a second equalizing unit configured to perform equalization on the received signal with IQ imbalance generated by the offset drift of a modulator of a transmitter end being compensated;
 a third compensating unit configured to perform residual phase compensation on the equalized received signal; and
 an outputting unit configured to judge the residual phase compensated received signal and output the received signal.

Supplement 7. A receiver, including the compensation apparatus for an offset drift of a modulator of a transmitter end as described in any one of supplements 1-5 or the received signal recovery apparatus as described in supplement 6.

Supplement 8. A compensation method for an offset drift of a modulator of a transmitter end, including:
 compensating for IQ imbalance generated at a receiver end by a received signal of the receiver end;
 performing equalization on the compensated received signal;
 estimating a frequency difference between a transmitter end laser and a receiver end laser and phase noises of the transmitter end laser and the receiver end laser according to the equalized received signal;
 performing phase recovery on the compensated received signal according to the estimated frequency difference and phase noises; and
 for the phase recovered received signal, compensating for IQ imbalance generated by the offset drift of the modulator of the transmitter end.

Supplement 9. The method according to supplement 8, wherein the method further includes:

estimating a level of IQ imbalance in the received signal with the IQ imbalance generated by the offset drift of the modulator of the transmitter end being compensated; and judging whether the estimated level of IQ imbalance satisfies a predetermined condition, when the estimated level of IQ imbalance satisfies the predetermined condition, outputting the received signal with the IQ imbalance generated by the offset drift of the modulator of the transmitter end being compensated and taking it as an offset drift compensated output signal, and when the estimated level of IQ imbalance does not satisfy the predetermined condition, outputting the received signal with the IQ imbalance generated by the offset drift of the modulator of the transmitter end being compensated, so that the equalization is re-performed on the received signal with the IQ imbalance generated by the offset drift of the modulator of the transmitter end being compensated, the frequency difference and the phase noises are re-estimated, the phase recovery is re-performed and the IQ imbalance generated by the offset drift of the modulator of the transmitter end is re-compensated.

Supplement 10. The method according to supplement 8, wherein the method is used in a dual-polarization optical communications system and further includes:

demultiplexing the equalized received signal to obtain received signals in two polarization states.

Supplement 11. The method according to supplement 10, wherein the estimating a frequency difference between a transmitter end laser and a receiver end laser and phase noises of the transmitter end laser and the receiver end laser according to the equalized received signal includes:

respectively estimating the frequency difference and the phase noises corresponding to the two polarization states according to the received signals in two polarization states; and taking mean values of the frequency difference and the phase noises in the two polarization states as the estimated frequency difference and phase noises.

Supplement 12. The method according to supplement 8, wherein the performing phase recovery on the compensated received signal according to the estimated frequency difference and phase noises includes:

temporally aligning the compensated received signal and the estimated phase noises; and performing phase recovery on the temporally aligned received signal according to the estimated frequency difference and phase noises.

Supplement 13. A received signal recovery method, including:

the compensation method for an offset drift of a modulator of a transmitter end as described in any one of supplements 8-12;

performing equalization on the received signal with IQ imbalance generated by the offset drift of a modulator of a transmitter end being compensated;

performing residual phase compensation on the equalized received signal; and judging the residual phase compensated received signal and outputting the received signal.

The invention claimed is:

1. A compensation apparatus in a receiver for an offset drift of a modulator of a transmitter end, comprising:
a memory that stores a plurality of instructions;
a processor that couples to the memory and configured to execute the plurality of instructions to:

compensate for IQ imbalance generated at a receiver end by a received signal of the receiver end;
perform equalization on a compensated received signal;
estimate a frequency difference between a transmitter end laser and a receiver end laser and phase noises of the transmitter end laser and the receiver end laser according to an equalized received signal;
perform phase recovery on the compensated received signal according to the estimated frequency difference and phase noises; and
for a phase recovered received signal, compensate for IQ imbalance generated by the offset drift of the modulator of the transmitter end,
wherein the processor is further configured to:
estimate a level of IQ imbalance in the received signal with the IQ imbalance generated by the offset drift of the modulator of the transmitter end being compensated,
judge whether the estimated level of IQ imbalance satisfies a predetermined condition,
when the estimated level of IQ imbalance satisfies the predetermined condition, output the received signal with the IQ imbalance generated by the offset drift of the modulator of the transmitter end being compensated as an offset drift compensated output signal, and
when the estimated level of IQ imbalance does not satisfy the predetermined condition, re-perform the equalization on the received signal with the IQ imbalance generated by the offset drift of the modulator of the transmitter end being compensated, re-estimate the frequency difference and the phase noises, re-perform the phase recovery and re-compensate for the IQ imbalance generated by the offset drift of the modulator of the transmitter end.

2. The compensation apparatus according to claim 1, wherein the compensation apparatus is used in a dual-polarization optical communications system and the processor is further configured to:
demultiplex the equalized received signal to obtain received signals in two polarization states.

3. The compensation apparatus according to claim 2, wherein the processor is configured to estimate the frequency difference between the transmitter end laser and the receiver end laser and phase noises of the transmitter end laser and the receiver end laser according to the equalized received signal,
the processor is further configured to:
respectively estimate the frequency difference and the phase noises corresponding to the two polarization states according to the received signals in two polarization states; and
take mean values of the frequency difference and the phase noises in the two polarization states as the estimated frequency difference and phase noises.

4. The compensation apparatus according to claim 1, wherein the processor is configured to perform the phase recovery on the compensated received signal according to the estimated frequency difference and phase noises, the processor is further configured to:
temporally align the compensated received signal and the estimated phase noises; and
perform phase recovery on the temporally aligned received signal according to the estimated frequency difference and phase noises.

5. A received signal recovery apparatus in a receiver, comprising:
a memory that stores a plurality of instructions;
a processor that couples to the memory and configured to execute the plurality of instructions to:
compensate for IQ imbalance generated at a receiver end by a received signal of the receiver end;
perform equalization on a received signal;
estimate a frequency difference between a transmitter end laser and a receiver end laser and phase noises of the transmitter end laser and the receiver end laser according to an equalized received signal;
perform phase recovery on the compensated received signal according to the estimated frequency difference and phase noises;
for a phase recovered received signal, compensate for IQ imbalance generated by an offset drift of an modulator of an transmitter end;
perform equalization on the received signal with IQ imbalance generated by the offset drift of the modulator of the transmitter end being compensated;
perform residual phase compensation on the equalized compensated received signal; and
judge a residual phase compensated received signal and output the received signal.

6. A receiver, comprising the compensation apparatus for the offset of the modulator of the transmitter end as claimed in claim 1.

7. A receiver, comprising the received signal recovery apparatus as claimed in claim 5.

* * * * *